May 18, 1937.  C. R. PATON  2,080,435
MOTOR VEHICLE
Original Filed Dec. 5, 1932   2 Sheets-Sheet 2
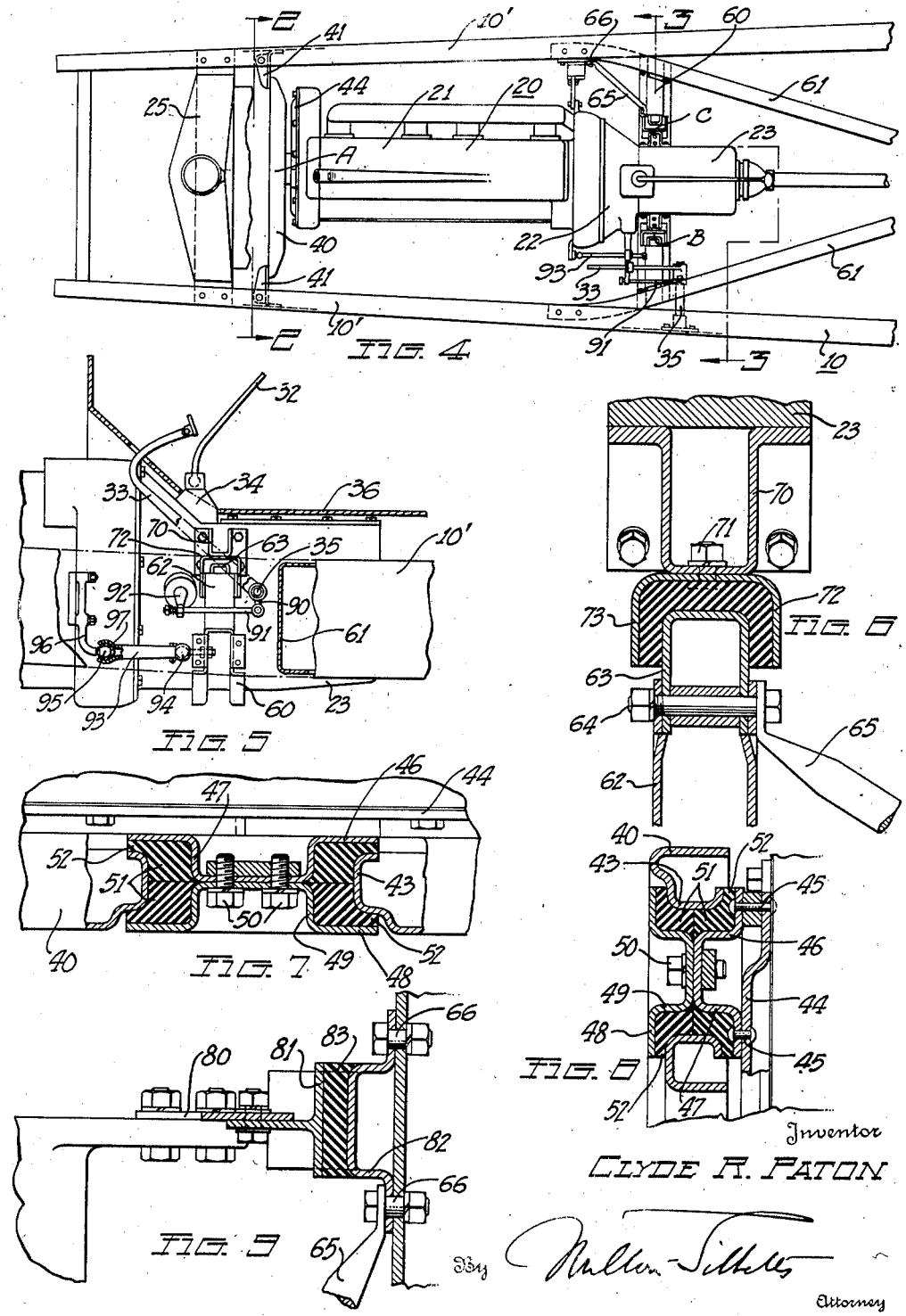

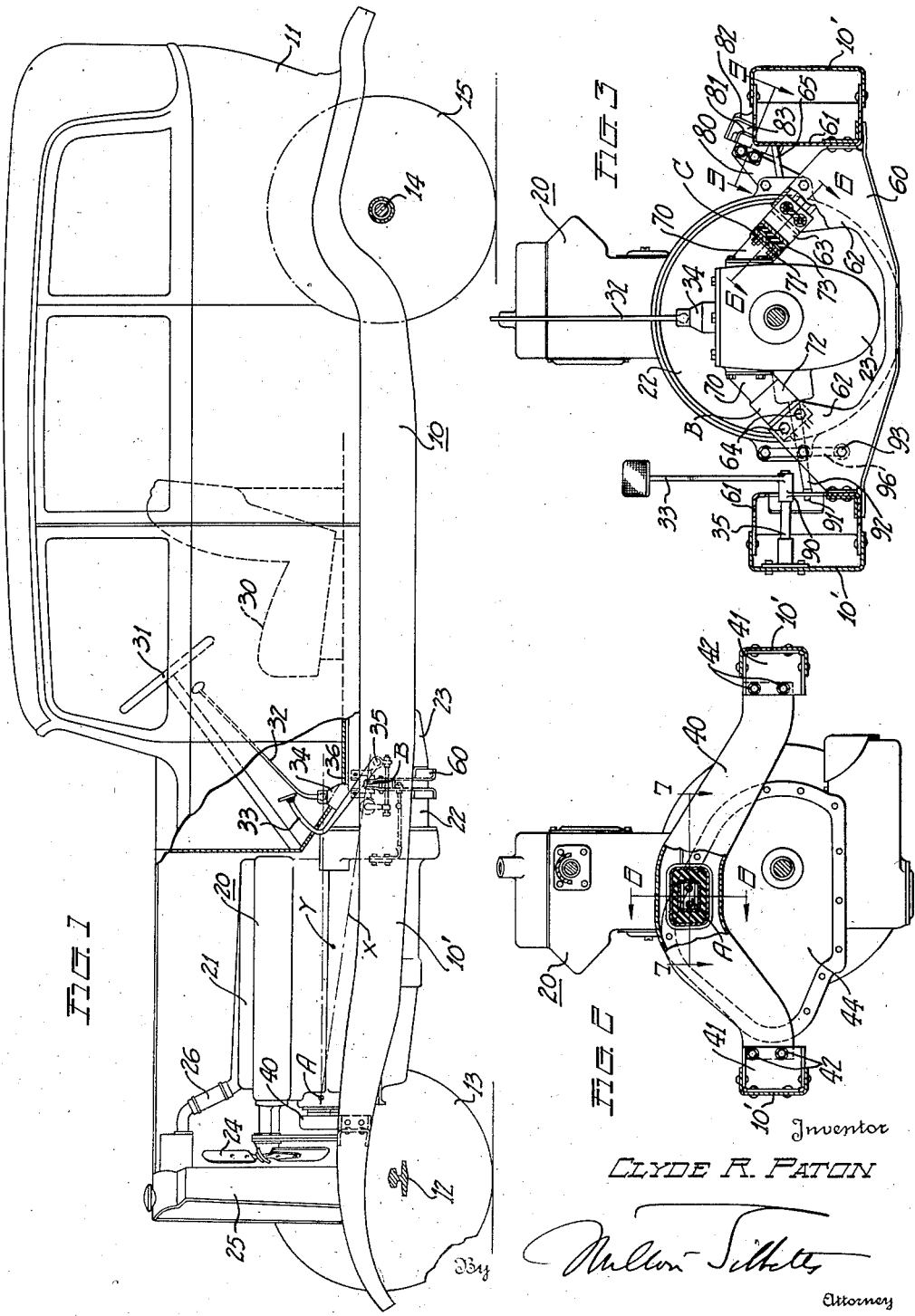

Patented May 18, 1937

2,080,435

UNITED STATES PATENT OFFICE 2,080,435

MOTOR VEHICLE

Clyde R. Paton, Birmingham, Mich., assignor to Packard Motor Car Company, Detroit, Mich., a corporation of Michigan Original application December 5, 1932, Serial No. 645,711. Divided and this application March 26, 1934, Serial No. 717,357. Renewed January 16, 1936

8 Claims. (Cl. 180—64)

This invention relates to motor vehicles and more particularly to the association of control mechanism between a relatively movable frame and engine, this application being a division of my application Serial No. 645,711 filed December 5, 1932.

An object of the invention is to provide control mechanism for a motor vehicle between two relatively movable parts which will not be disturbed in its operative relation by such movement.

Another object of the invention is to provide control mechanism mounted between a frame and a part movably mounted on the frame so that its operation will not be interfered with.

A further object of the invention is to provide a rigid connecting link between the engine and frame co-operating with an engine unit control element, such as a clutch operating shaft, for the purpose of confining the movement of the engine relative to the frame to a definite path so as not to interfere with the operation of the control element.

Other objects of the invention will appear from the following description taken in connection with the drawings, which form a part of this specification, and in which:

Fig. 1 is a side elevation of a motor vehicle made in accordance with the invention, parts being broken away to better illustrate the construction;

Fig. 2 is a somewhat enlarged vertical sectional view substantially on the line 2—2 of Fig. 4;

Fig. 3 is a somewhat enlarged vertical sectional view substantially on the line 3—3 of Fig. 4;

Fig. 4 is a plan view of the front portion of the vehicle shown in Fig. 1 with the body removed;

Fig. 5 is an enlarged side elevation of a portion of the vehicle adjacent the rear end of the engine unit, with a side frame member broken away;

Fig. 6 is an enlarged section on the line 6—6 of Fig. 3;

Fig. 7 is an enlarged section on the line 7—7 of Fig. 2;

Fig. 8 is an enlarged section on the line 8—8 of Fig. 2, and

Fig. 9 is an enlarged section on the line 9—9 of Fig. 3.

Referring to the drawings, 10 represents the vehicle frame and 11 is the body mounted thereon. The frame is composed of the usual side members and several cross members and with the body attached to it the frame and body become a structural unit, the rear portion of which, by reason of the body connection, is more rigid than the front portion. The front end of the frame therefore is subject to a torsional vibration about a neutral axis extending longitudinally of the frame. This may be caused by wheel wobble or axle tramp or otherwise by the road shocks to which the vehicle is subjected. The vertical location of this axis may, at the front of the car, lie near the plane of the frame side rails.

The front axle is indicated at 12, with its wheels 13, and the rear axle is shown at 14 with its wheels 15. These axles are connected in any suitable manner to the frame through the usual springs which are not shown in the drawings.

The engine or propulsion unit in general is indicated by the numeral 20, and as shown it comprises the engine part 21, the clutch part 22 and the gearing part 23, which three parts include suitable casings which may be made integral or in several sections. As shown the engine crank case is secured to the clutch casing and the clutch and gear casings are an integral casting.

At the front end of the engine is a fan 24 and its driving mechanism, and in front of the fan is the usual radiator 25 suitably supported on the frame 10. A flexible pipe 26 connects the upper part of the water jacket of the engine 21 to the upper part of the radiator 25, and a similar connection, not shown, is arranged between the lower part of the radiator and the engine water pump.

The driver's seat of the vehicle is indicated at 30 and in front of this seat is the usual steering wheel and column 31. Also extending into the front compartment of the vehicle and within easy reach of the driver is a gear shift lever 32 and a clutch lever 33, the former being adapted for operation by hand and the latter by the driver's foot, in the usual way. The gear shift lever 32 is mounted for universal pivotal movement in a short tower or casing 34 mounted on the clutch or gear casing, and the lower end of the lever extends into the gear casing for moving the shiftable gears. The clutch lever 33 is pivotally supported on the vehicle frame, as at 35, see Figs. 1 and 3. The tower 34 and the clutch lever 33 extend through suitable openings in the floor boards 36 of the vehicle.

The engine or engine unit 20 is supported on the frame at three points, A, B, and C, the point A being at the front end of the engine unit and the points B and C being substantially separated from each other near the rear end of the unit. A plane through the centers of these three points is indicated at X in Fig. 1, and these points are so arranged with relation to the distribution of weight of the engine unit that the center of gravity of the unit is close to the plane X. Thus in the engine unit illustrated the center of gravity thereof is substantially at the point Y, in Fig. 1, which is just slightly above the plane X above referred to. Hence the three engine supports are well placed to resist the tendency of the unit as a whole to move laterally during the operation of the vehicle in turning or otherwise.

The engine support A is substantially in line horizontally with the pivotal mounting of the gear shift lever 32 in the tower or casing 34, and the supports B and C are so arranged and constructed relative to the tower 34, and the flexibility of these supports is such that the relative rotary movement of the engine, due to its reaction to the impulses thereof, is substantially on an axis passing through said tower 34 and the pivot of the gear shift lever, so that the rocking movement of the engine referred to produces a minimum of vibration of the tower and of the gear shift lever pivot, with respect to the floorboards 36 through which the tower passes. The specific construction of the supports B and C will be hereinafter described.

The front mounting A is shown in Figs. 1 and 2 and its details are illustrated in Figs. 7 and 8. The channel side members of the frame 10 may be referred to as 10' in the drawings, and a front cross member is indicated at 40. This cross member is removably secured to brackets 41 on the side members 10' as by the bolts 42. Adjacent the middle portion of the cross member 40 there is a rectangular opening and the metal of the web is bent in a U-shape to form the boundary of this opening as shown at 43 in Figs. 7 and 8. The rectangular opening is longer horizontally than it is vertically as particularly shown in Figs. 2, 7, and 8. A front cover 44 of the motor has riveted to it as at 45 a plate 46 which is formed with a rectangular boss 47 extending forwardly from the motor cover. A similar plate 48 with a reversely formed boss 49 is detachably secured to the plate 46 as by the bolts 50. The exterior diameter of the plates 46, 48 is greater than the opening in the cross member 40, and the rectangular bosses 47, 49, are somewhat smaller than that opening, thus leaving a rectangular space between the bosses and the U-shaped walls 43 of the cross member 40. Also, this rectangular space is narrower above and below the bosses than at the sides of the bosses. The rectangular space referred to is filled with rubber or similar material, shown in the form of two rubber blocks 51 conforming to the rectangular space and having flanges 52 fitting between the sides of the U-shaped parts 43 and the flat portions of the plates 46, 48. This rubber filling is made in the form of two blocks instead of one, for the convenience of assembling.

With this construction the front end of the engine unit is supported on the cross member 40 of the vehicle frame through a flexible mounting which will permit limited rocking action of the engine about an axis passing through the middle of the bosses 47, 49 of the support A, but the rectangular shapes of the bosses and of the opening in the cross member 40 definitely limit this rocking motion. This support insulates the engine from the frame and by reason of the position of the support somewhat above the frame side members there is a distinct tendency on the part of the engine to limit or dampen the torsional movements of the front end of the vehicle frame such as are due to tramping action of the vehicle or to rough roads.

The rear supports for the engine are shown in Figs. 3 and 4 and in some detail in Fig. 6. Here there is a frame cross member 60 riveted or otherwise secured to parts of the frame 10 such as the diagonally extending members 61 thereof. The cross member 60 extends beneath the gear casing 23 and has an upwardly extending arm 62 at each side of the gear casing and adjacent thereto. An inverted U-shaped member 63 is detachably connected as by bolts 64 to each of the arms 62, and a diagonal brace member 65 may be provided from the upper end of each arm 62 to a point at the side of the frame 10 where it is secured as at 66. Only one such brace member is illustrated.

Upon each side of the engine unit adjacent the arms 62 is a bracket 70 having detachably secured to it as by bolts 71 an inverted U-shaped member 72 which is larger than and surrounds the U-shaped member 63, as shown particularly in Figs. 3, 4, and 6. Arranged between and preferably cemented or vulcanized or otherwise secured to the members 63 and 72 is a U-shaped block of rubber 73. Thus the rear portion of the engine unit is yieldably supported through these rubber blocks.

By reference particularly to Figs. 3 and 6 it will be seen that the rubber blocks 73 extend diagonally in a vertical plane transversely of the vehicle so that the rubber is in shear when resisting relative movement of engine and frame in a path substantially normal to a radius from the upper end of the gear shift tower 34. Since this is true of both of the rubber blocks, and since the front end of the engine is flexibly supported at a single point by the support A, the rocking action of the engine in the frame, due to the reaction of the impulses within the engine, will be substantially about an axis passing through the front support and through the gear shift lever tower, thus minimizing movement of the gear shift lever and tower due to such rocking action of the engine.

But the support of the rear portion of the engine through these mountings B and C is not on the rubber in shear, but mostly on the rubber in compression, and by reason of the diagonal arrangement of these supports the engine is firmly held within small limits so far as lateral bodily movement is concerned. Also, by reason of the U-shape of the rubber blocks 73, as shown in Fig. 6, the engine is quite definitely limited in its longitudinal movement in the frame. In this latter both the front and rear mountings lend assistance.

In some cases it is found desirable to more definitely limit the rocking action of the engine as referred to above and for this purpose the present invention provides a limit arm connection to the frame. There may be one or more of these arms. As shown, an arm 80 is detachably secured to one side of the engine unit and upon this is mounted a U-shaped member 81 which extends into a U-shaped member 82 secured to the side frame member 10'. Between these members 81, 82 is a rubber block 83 which is cemented or vulcanized or otherwise secured to them.

Thus the rubber block 83 acts partly in shear and partly in compression as it operates to check the rocking action of the engine. It is shown as mounted substantially normal to a radius extending from the upper end of the tower 34 for most effective action.

The clutch lever 33 and its pivotal support 35 on the frame 10 of the vehicle has been hereinabove described. It is connected to operate the clutch through an arm 90, a link 91 and a lever 92, the latter extending into the clutch housing and hence mounted on the engine unit. The flexible engine mounting above described will of course permit a limited amount of movement of the engine longitudinally of the frame and it is obvious that such movement would be likely to interfere with the operation of the clutch through this leverage. For the purpose of confining the movement of the engine relative to the frame to a definite path so as not to interfere with the operation of the clutch or other engine unit control elements, a guide link 93 is provided, which link is preferably substantially the same length as the link 91 and is shown as arranged parallel thereto. The link 93 is connected by a universal pivot 94 to the frame 10 or to the cross member 60 thereof and by a universal pivot 95 on a bracket 96 on the engine unit. Insulation is provided by means of bushings 97 preferably of rubber. This construction is particularly illustrated in Figs. 1, 3, 4, and 5.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a supporting frame, an engine unit including a clutch, means for yieldingly supporting the engine unit on the frame, a clutch operating lever mounted on the frame, a link connection from the clutch lever to the clutch, and a rigid guide link universally connected at its ends to the frame and engine unit respectively.

2. In a motor vehicle, the combination of a supporting frame, an engine unit yieldingly mounted thereon, an operating lever connected to the frame, a connection on said lever to a device on said engine unit, rigid guiding means universally connected at its ends to the frame and unit respectively for defining the path of movement of the engine relative to the frame, and insulation means in the guiding means.

3. In a motor vehicle, the combination of a supporting frame, an engine unit, yielding supporting means for the engine unit on the frame, an operating lever mounted on the frame, connections from said lever to an operated device on the engine unit, a connection from the engine unit to the frame to limit the rocking action of the unit, and a separate guide connection between the engine unit and the frame arranged parallel to and adjacent the operating connection said guide connection being pivoted at its ends to the engine unit and frame respectively.

4. In a motor vehicle, the combination of a supporting frame, an engine unit, yielding supporting means for the engine unit on the frame, an operating lever mounted on the frame, connections from said lever to an operated device on the engine unit, a laterally extending connection from the engine unit to the frame to limit the rocking action of the unit, and a separate guide connection between the engine unit and the frame extending longitudinally of the vehicle to define the movement of the unit relative to the frame said guide connection being pivoted at its ends to the engine unit and frame respectively.

5. In a motor vehicle, the combination of a supporting frame, a propulsion unit including a clutch, means for yieldingly supporting the propulsion unit on the frame, a clutch operating lever mounted on the frame, a link connection from the clutch operating lever to the clutch, and means between the frame and the propulsion unit for defining the path of movement of the propulsion unit on its supporting means relative to the frame to prevent such movement interfering with the clutch operation, said defining means comprising a link connected to the propulsion unit and to the frame and having rubber insulation eliminating metal contact, said defining means being so formed that it defines the path of movement without at the same time appreciably retarding or limiting the rocking action of the unit.

6. In a motor vehicle, the combination of a supporting frame, a propulsion unit including a clutch, means for yieldingly supporting the propulsion unit on the frame, a clutch operating lever mounted on the frame, a link connection from the clutch operating lever to the clutch, and a guiding means between the frame and the propulsion unit including a link arranged substantially parallel to the first said connecting link and connected at its ends to said frame and said unit, and said guiding means including rubber insulation means, the construction of said link and connections and insulation means being such that the guiding means will define the path of movement of the propulsion unit relative to the frame to prevent the propulsion unit movement from interfering with the operation of the clutch without at the same time appreciably retarding or limiting the rocking action of the unit.

7. In a motor vehicle, the combination of a supporting frame, a propulsion unit yieldingly mounted thereon, a lever pivoted on the frame, a device on the propulsion unit adapted to be operated by said lever, a connecting link between the lever and said device, and a guiding means between the frame and the propulsion unit including a link arranged substantially parallel to the first said connecting link and having connections to the frame and unit, and insulation means in the guiding means, the construction of said link and connections and insulation means being such that the guiding means will define the path of movement of the propulsion unit relative to the frame to prevent the propulsion unit movement from interfering with the operation of said device without at the same time appreciably retarding or limiting the rocking action of the unit.

8. In a motor vehicle, the combination of a supporting frame, an engine unit yieldingly mounted thereon, a lever pivoted on the frame, a device on the engine unit adapted to be operated by said lever, a connecting link between the lever and said device, and a connecting link of substantially the same length as and parallel to the first connecting link and pivoted at its ends to the frame and said unit respectively.

CLYDE R. PATON.